US011635119B2

(12) United States Patent
Gómez Benéitez et al.

(10) Patent No.: US 11,635,119 B2
(45) Date of Patent: Apr. 25, 2023

(54) BRAKE DEVICE

(71) Applicant: BRL BRAKE SOLUTIONS, S.L., Valladolid (ES)

(72) Inventors: José María Gómez Benéitez, Simancas (ES); Fernando Gómez de Sebastián, Simancas (ES)

(73) Assignee: BRL Brake Solutions, S.L., Valladolid (ES)

(*) Notice: Subject to any disclaimer, the term of this patent is extended or adjusted under 35 U.S.C. 154(b) by 509 days.

(21) Appl. No.: 16/648,274

(22) PCT Filed: Sep. 10, 2018

(86) PCT No.: PCT/ES2018/070590
§ 371 (c)(1),
(2) Date: Mar. 18, 2020

(87) PCT Pub. No.: WO2019/058009
PCT Pub. Date: Mar. 28, 2019

(65) Prior Publication Data
US 2020/0217381 A1 Jul. 9, 2020

(30) Foreign Application Priority Data
Sep. 22, 2017 (ES) ................ ES201731144

(51) Int. Cl.
*F16D 65/853* (2006.01)
*F16D 65/78* (2006.01)

(52) U.S. Cl.
CPC ...... *F16D 65/853* (2013.01); *F16D 2065/784* (2013.01); *F16D 2200/0013* (2013.01)

(58) Field of Classification Search
CPC ........... F16D 65/853; F16D 2055/0058; F16D 2065/784; F16D 55/40; F16D 2065/783;
(Continued)

(56) References Cited

U.S. PATENT DOCUMENTS 2,821,271 A * 1/1958 Sanford ............... F16D 55/46
188/71.6
2,835,357 A * 5/1958 Burnette ............... F16D 48/02
192/85.45
(Continued)

FOREIGN PATENT DOCUMENTS

CH 242481 A1 5/1946
CN 2933991 Y * 8/2007
(Continued)

OTHER PUBLICATIONS

English translation of CN 2933991 Y (Year: 2007).*
ES 2792148 B2 (Year: 2021).*

*Primary Examiner* — Nicholas J Lane
*Assistant Examiner* — Mahbubur Rashid
(74) *Attorney, Agent, or Firm* — The Webb Law Firm

(57) ABSTRACT

A brake device for installation on an axle of wheels including a piston; a casing accommodating at least the piston; a container; a first cast iron disc and a second cast iron disc, joined to the container; a first brake lining; a first supporting disc on which the first brake lining is located; and a bearing fixed to the central cylindrical wall of the container around the axle. The container and the casing remain fixed without rotating about the axle and the first brake lining together with the first supporting disc are fixed to the axle. The piston is further configured to displace the container together with the two cast iron discs towards the first brake lining until the first cast iron disc makes contact with the first brake lining. The container includes an inner circuit configured to accommodate a coolant.

11 Claims, 10 Drawing Sheets

(58) Field of Classification Search
CPC .......... F16D 2055/0091; F16D 55/228; F16D 65/128; F16D 59/02; F16D 2065/1328; F16D 25/0638; F16D 65/84; F16D 65/78; F16D 13/72; F16D 13/52; F16D 2055/002; F16D 2055/0037; F16D 2065/788; F16D 65/08; F16D 65/833; F16D 2000/0013; B60T 5/00; B60T 1/065; B61H 5/00
See application file for complete search history.

(56) References Cited

U.S. PATENT DOCUMENTS

| | | | | |
|---|---|---|---|---|
| 2,968,369 | A * | 1/1961 | Parrett | F16D 55/46 |
| | | | | 188/71.6 |
| 3,007,554 | A * | 11/1961 | Eames | B60T 1/065 |
| | | | | 188/71.6 |
| 3,059,730 | A * | 10/1962 | Nickell | F16D 25/10 |
| | | | | 192/85.41 |
| 3,089,572 | A * | 5/1963 | Herfurth | F16D 48/02 |
| | | | | 192/85.45 |
| 3,098,549 | A * | 7/1963 | Schick | F16D 25/10 |
| | | | | 192/85.33 |
| 3,303,911 | A | 2/1967 | Hause et al. | |
| 3,572,477 | A * | 3/1971 | Ewart | F16D 65/853 |
| | | | | 188/71.6 |
| 3,584,708 | A * | 6/1971 | Heck | B60T 1/065 |
| | | | | 188/71.6 |
| 3,633,714 | A * | 1/1972 | Klaue | B60T 1/10 |
| | | | | 188/71.6 |
| 3,862,678 | A * | 1/1975 | Collins | F16D 25/0635 |
| | | | | 192/85.61 |
| 4,020,934 | A * | 5/1977 | Eichinger | F16D 25/10 |
| | | | | 192/85.41 |
| 4,153,148 | A * | 5/1979 | Malinowski | F16D 25/10 |
| | | | | 192/85.61 |
| 4,262,789 | A * | 4/1981 | Collins | F16D 25/123 |
| | | | | 192/85.49 |
| 4,483,422 | A * | 11/1984 | Cory | F16D 55/40 |
| | | | | 188/71.6 |
| 4,815,573 | A | 3/1989 | Miyata | |
| 6,491,139 | B1 | 12/2002 | Budica | |
| 6,516,924 | B1 * | 2/2003 | Michael | F16D 65/853 |
| | | | | 188/71.6 |
| 7,591,349 | B2 * | 9/2009 | McConkie | F16D 55/42 |
| | | | | 188/71.6 |
| 8,020,673 | B2 * | 9/2011 | McIver | B60T 1/10 |
| | | | | 188/71.6 |
| 8,776,955 | B2 * | 7/2014 | Hakon | F16D 55/36 |
| | | | | 188/71.6 |
| 9,309,941 | B2 * | 4/2016 | Hakon | F16D 55/42 |
| 2007/0095621 | A1 | 5/2007 | McConkie et al. | |
| 2008/0023275 | A1 * | 1/2008 | Younggren | F16D 55/40 |
| | | | | 188/71.6 |
| 2009/0267406 | A1 | 10/2009 | Thompson | |
| 2013/0180808 | A1 | 7/2013 | McClintic | |
| 2013/0341136 | A1 | 12/2013 | Boonpongmanee et al. | |
| 2014/0014446 | A1 * | 1/2014 | Boonpongmanee | F16D 65/128 |
| | | | | 188/71.6 |
| 2017/0002874 | A1 * | 1/2017 | Herkommer | F16D 48/06 |
| 2017/0248185 | A1 * | 8/2017 | Isono | F16D 65/186 |

FOREIGN PATENT DOCUMENTS

| | | |
|---|---|---|
| DE | 2334627 A1 | 1/1975 |
| DE | 2363104 A1 | 6/1975 |
| GB | 595283 A | 12/1947 |
| JP | S6117717 A | 1/1986 |
| WO | 2007107771 A1 | 9/2007 |

* cited by examiner

BRAKE DEVICE

CROSS-REFERENCE TO RELATED APPLICATIONS

This application is the United States national phase of International Application No. PCT/ES2018/070590 filed Sep. 10, 2018, and claims priority to Spanish Patent Application No. P201731144 filed Sep. 22, 2017, the disclosures of which are hereby incorporated by reference in their entirety.

BACKGROUND

Field of the Invention

The present invention relates to a brake device with a novel braking system that increases the braking capacity and has a cooling system that ensures the thermal stability thereof and increases the lifespan of the components of the brake device. It is applicable to different industries, for example, in the automotive, railway, and aviation industries, that is, all industries where braking devices operate.

DESCRIPTION OF RELATED ART

In the state of the art, very different types of braking systems are known; particularly in the automotive sector, different types of braking systems have been developed.

The most widespread braking system in the automotive sector is the brake disc braking system, wherein the driver presses the brake pedal to activate a hydraulic system that displaces brake pads towards a brake disc that rotates jointly with the wheels of the vehicle, and by means of friction between the brake pads and the brake disc, the braking of the wheels and consequently of the vehicle takes place.

In this braking system, the brake disc, as already stated, continuously and jointly rotates with the wheels of the vehicle while the pads are in a fixed position with respect to the wheel. By axially displacing the pads towards the brake disc, until making contact with the disc and, by keeping the pressure on the pads against the brake disc, friction is generated that causes the disc to brake and therefore the wheels of the vehicle to brake.

This system presents a problem due to the temperature increase in the area of the pads, which is in contact with the disc, which is caused by friction between the pads and the brake disc. This temperature increase can damage the pads (with a phenomenon known as crystallisation of the same), which would affect the braking capacity of the system or could even lead, in an extreme case, to the deformation of the very pads or of the brake disc, damaging the braking system, and many other derivatives of the thermal problem. Due to the aforementioned, the brake disc braking system requires cooling that attempts to dissipate the heat generated during braking.

Due to the fact that the brake disc is constantly rotating, it is currently very difficult to obtain a system that cools the same. Moreover, given the surface of the brake pads, it is also difficult to install a cooling system therein that dissipates the heat generated.

In order to dissipate the heat generated during braking, the systems known in the state of the art use the very airflow that surrounds the braking system when the vehicle circulates, these systems being not entirely efficient.

Furthermore, in the systems known in the state of the art there is wear on the pads and on the brake disc due to intermittent friction between these two elements, such that the useful life of the pads and of the brake discs is quite limited.

Likewise, brake discs and brake pads of materials that withstand high temperatures and with high resistance to wear have been developed, among them the ceramic discs used in high-performance and very expensive vehicles are known, which require more efficient braking systems, enabling better performance, but that ultimately do not solve the thermal problem.

SUMMARY

The present invention relates to a brake device that has a cooling system that achieves great heat dissipation, so that the useful life of the components thereof is long and therefore the maintenance to be performed is reduced with respect to the devices known in the state of the art.

Another advantage that it possesses is that by having a greater contact area than current systems, in which the contact surface is limited to the size of the brake pad which is of reduced dimensions, compared to the surface of the brake lining of the present invention, the force necessary for braking is lower and the braking capacity is greater.

The brake device for installation on an axle of wheels object of the invention comprises a piston, a casing that accommodates at least the piston; further comprising a container, a first cast iron disc and a second cast iron disc, both cast iron discs joined to the container; further comprising a first brake lining, a first supporting disc on which the first brake lining is located and finally further comprising a bearing fixed to the container.

In the brake device for installation on an axle of wheels object of the invention, the piston and the container remain fixed without rotating about the axle and the first brake lining together with the first supporting disc rotate together with the axle, wherein the piston is further configured to move the container together with the two cast iron discs towards the first brake lining until the first cast iron disc makes contact with the first brake lining, and wherein the container comprises an inner circuit configured to accommodate a coolant.

In the brake device object of the invention, the inner circuit of the container is limited by a central cylindrical wall located around the axle, an outer cylindrical wall and the two cast iron discs that join the central cylindrical wall and the outer cylindrical wall.

The brake device object of the invention comprises a first spring around the axle of the wheels, such that the first spring rests at one end on the bearing and at another end on the first supporting disc, wherein the first spring is configured to exert pressure on the first supporting disc when the first cast iron disc makes contact with the first brake lining, and to move the piston, the container and the first cast iron disc away from the first brake lining.

The brake device object of the invention in a second embodiment further comprises a second brake lining on a second supporting disc, between the piston and the container.

In this second embodiment the piston is configured to move the second brake lining towards the second cast iron disc of the container, in a displacement prior to the displacement of the container and the first cast iron disc thereof towards the first brake lining.

The brake device object of the invention, in this second embodiment, comprises a second spring around the axle of the wheels, which rests at one end on the second supporting disc and at another end on the bearing, such that the second spring is configured to exert pressure on the second supporting disc when the second cast iron disc makes contact with the second brake lining, and to move the piston, the container and the second cast iron disc away from the second brake lining.

The container of the brake device in both embodiments comprises a first hole to access the inner circuit and a second hole to access the inner circuit such that the coolant travels along the inner circuit by accessing it through the first hole and exiting it through the second hole.

In addition to the foregoing, the container further comprises an inner wall located in the inner circuit, such that said inner wall forces the coolant to travel along the inner circuit.

The brake device further comprises tubes that join the first hole and the second hole to a heat exchanger for the coolant.

The brake device object of the invention comprises at least one sensor in the container to control the temperature of the coolant.

In the brake device, the casing comprises a plurality of perimeter channels and the container comprises a plurality of perimeter ball bearings, such that the perimeter ball bearings face the perimeter channels of the casing and the perimeter ball bearings are configured to slide along the aforementioned perimeter channels.

Alternatively to the foregoing option, in the brake device the casing comprises a plurality of perimeter threaded holes accommodating guide screws, and the container comprises a plurality of perimeter lugs, wherein the perimeter lugs accommodate the guide screws to guide a sliding of the container along the guide screws.

BRIEF DESCRIPTION OF THE DRAWINGS

To complete the description, and for the purpose of helping to make the features of the invention more readily understandable, this specification is accompanied by a set of drawings constituting an integral part of the same, which by way of illustration and not limitation represent the following.

Figure 1:
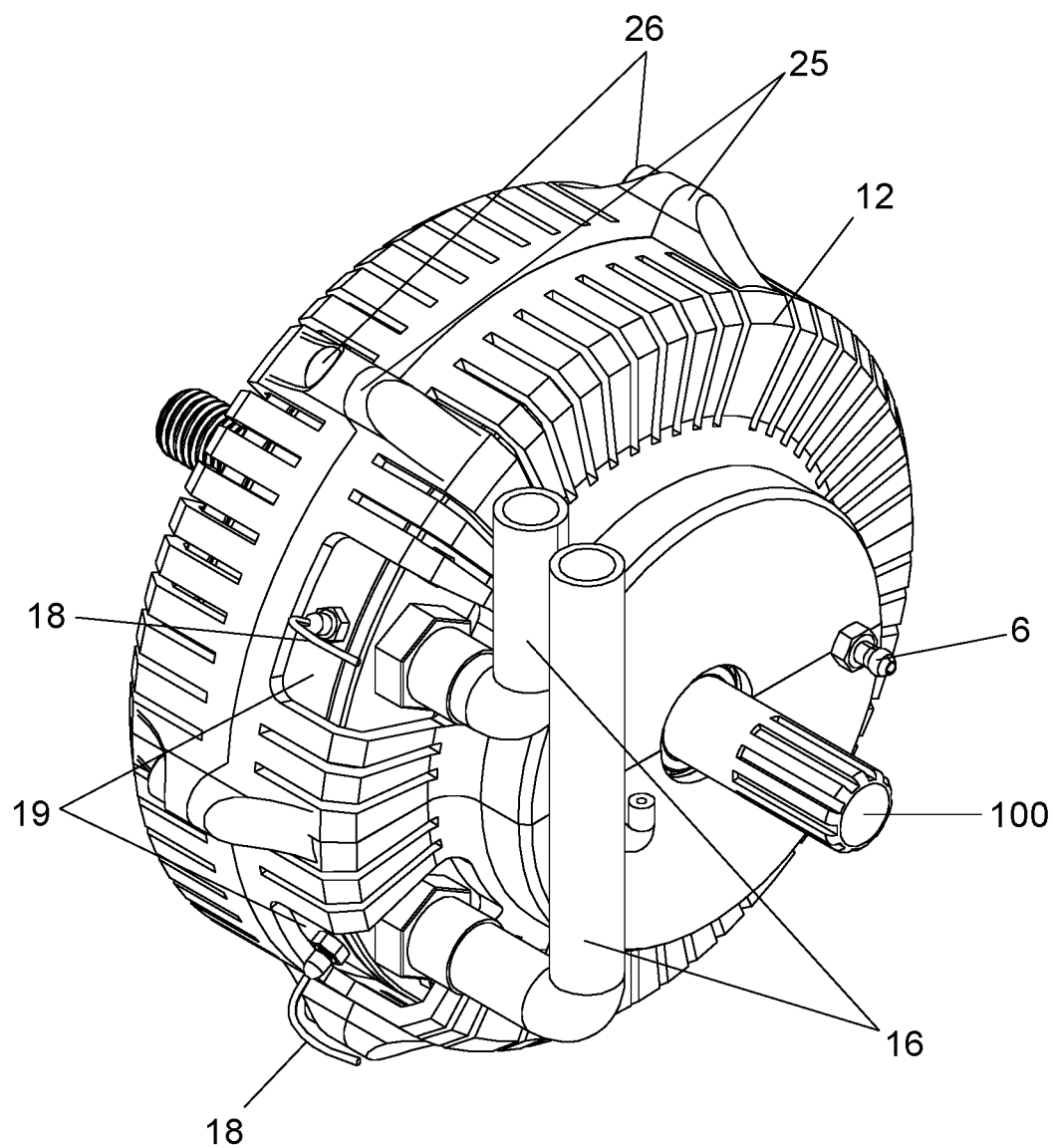
FIG. 1 shows a perspective view of the first embodiment of the brake device object of the invention.
Figure 2:
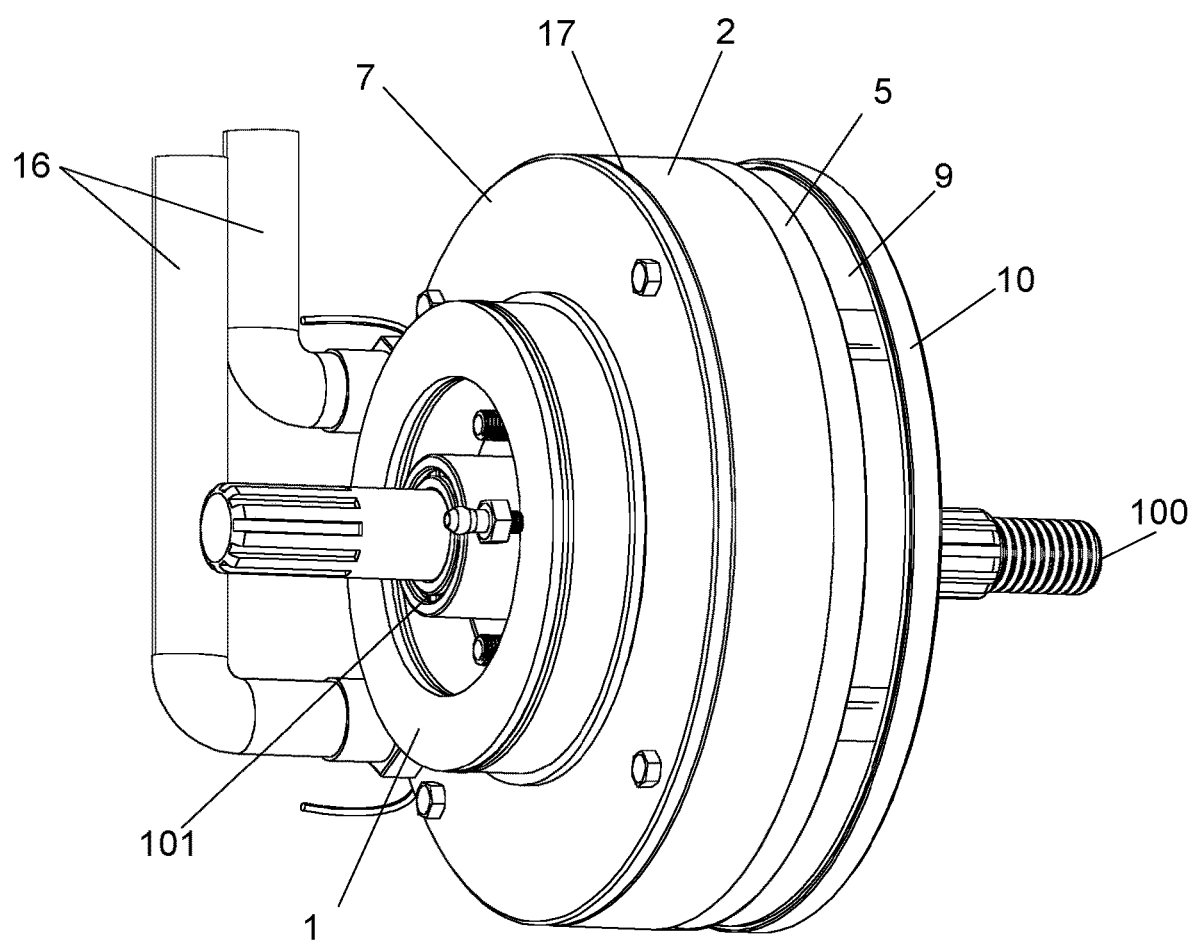
FIG. 2 shows a perspective view of the first embodiment of the brake device object of the invention having removed the casing accommodating the piston, in braking position.
Figure 3:
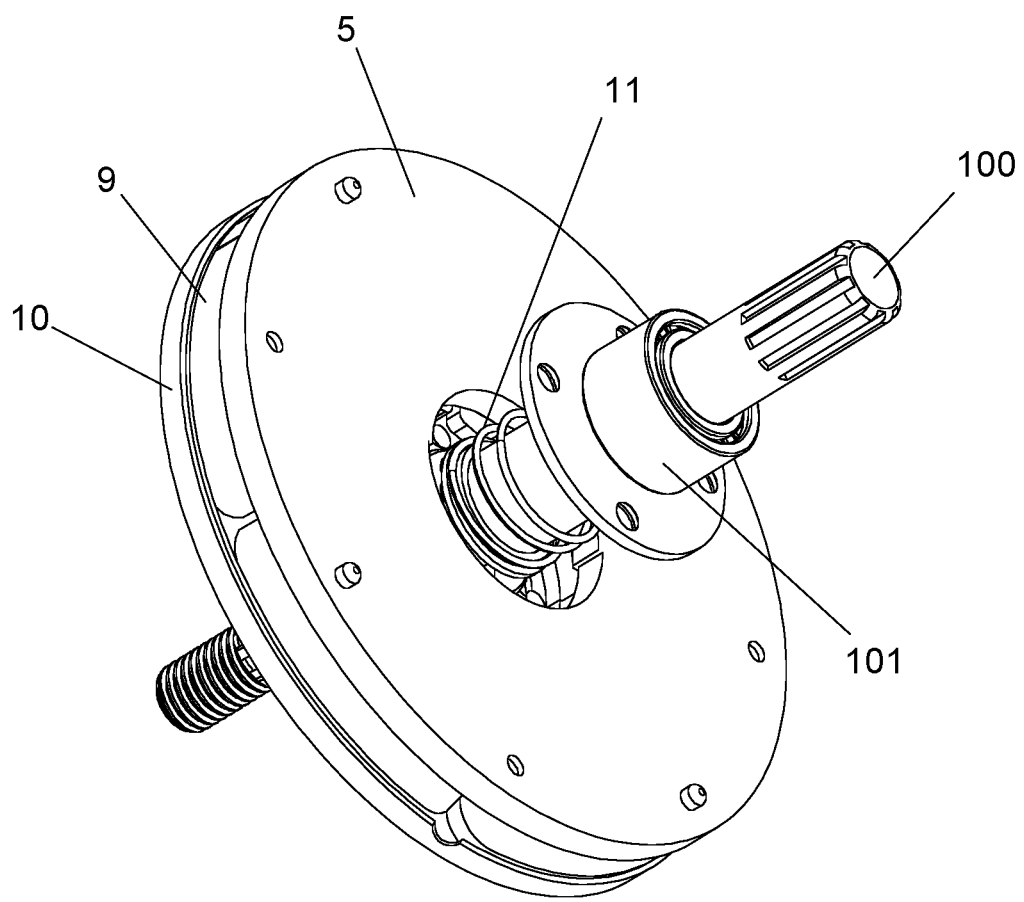
FIG. 3 shows a perspective view of the first brake lining joined to the supporting disc, in contact with the lid or cast iron disc of the container.
Figure 4:
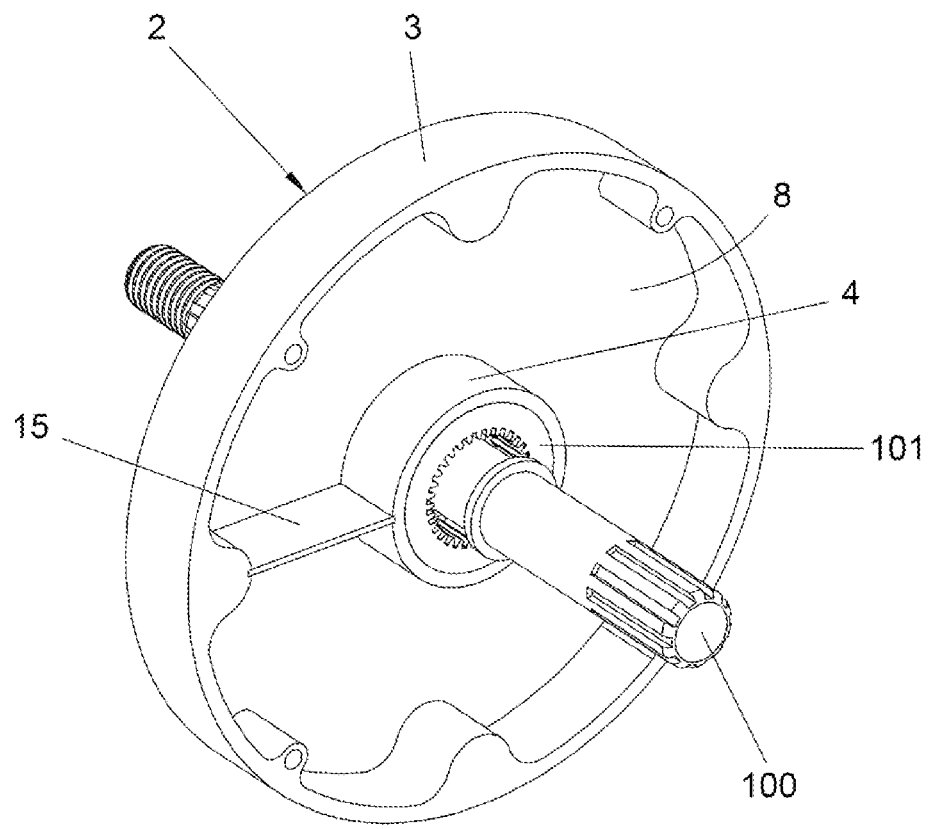
FIG. 4 shows a perspective view of the container having removed the first cast iron disc according to the first embodiment of the device object of the invention.
Figure 5:
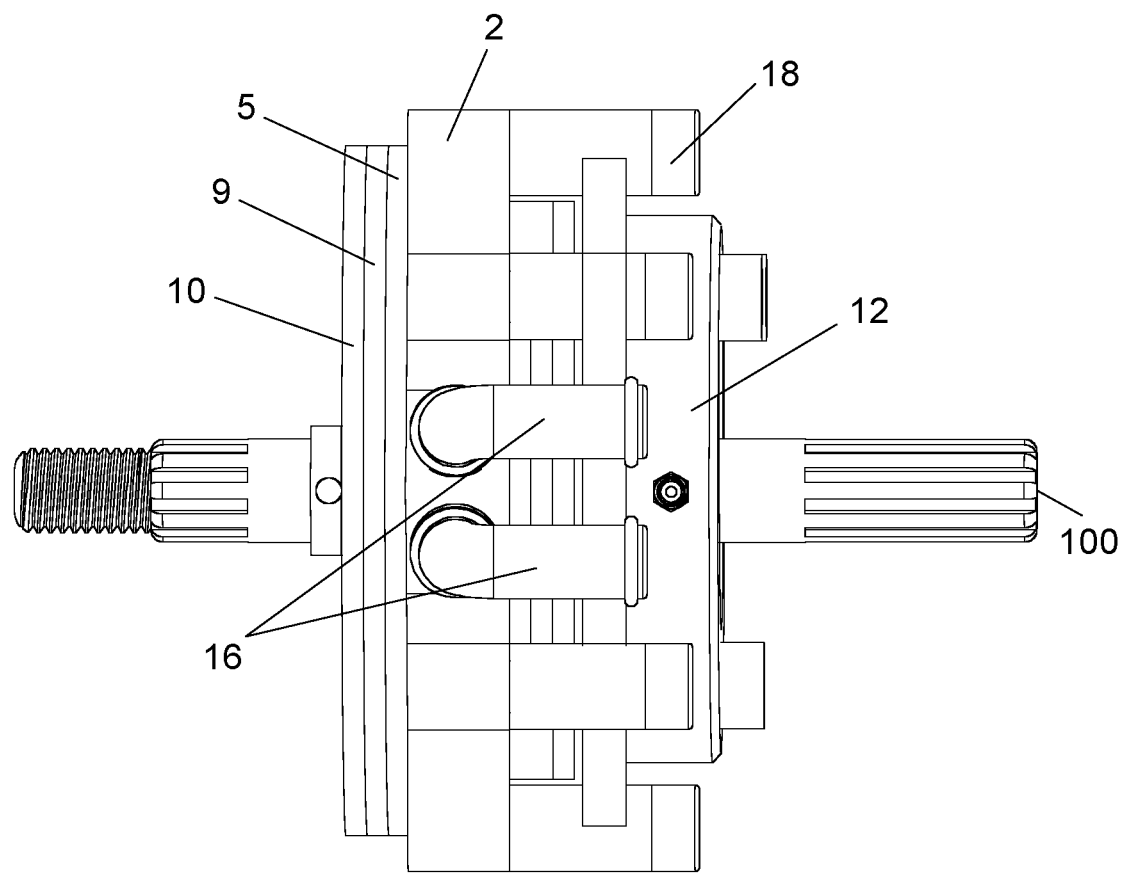
FIG. 5 shows a side view of the second embodiment of the brake device object of the invention.
Figure 6:
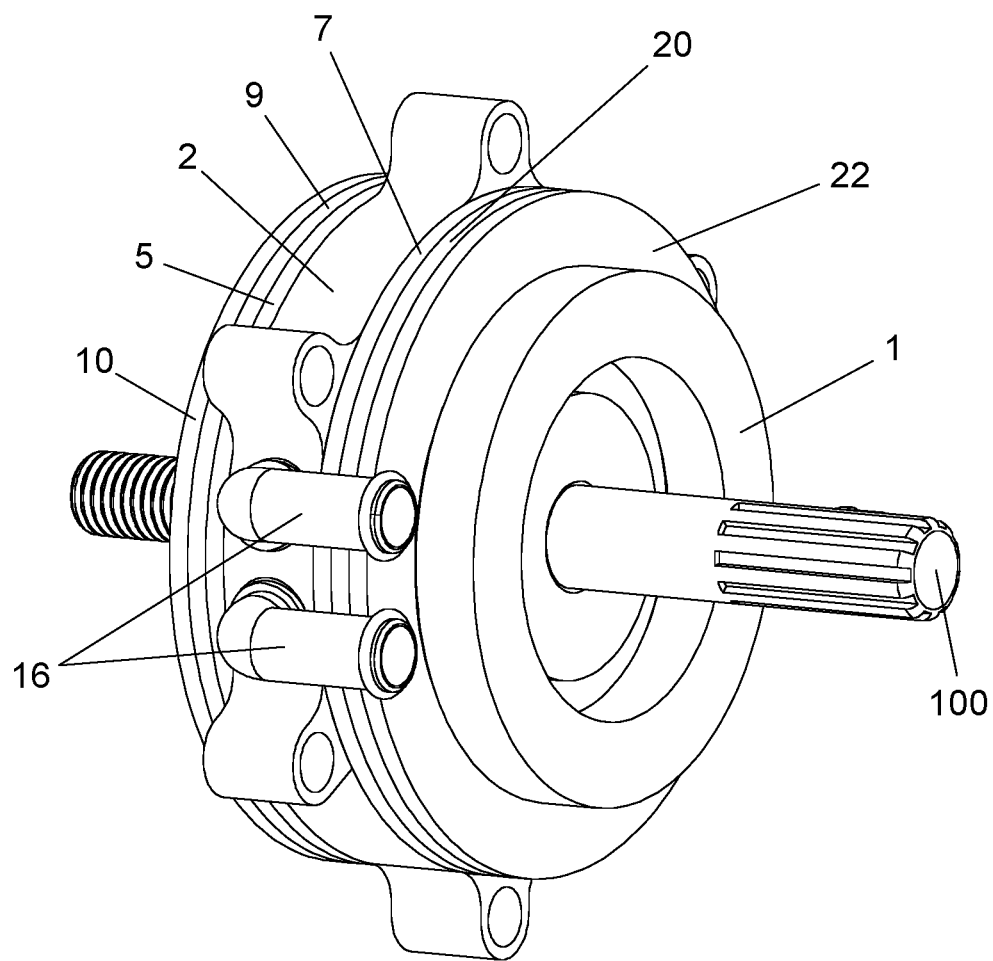
FIG. 6 shows a perspective view from a viewpoint opposite to FIG. 5.
Figure 7:
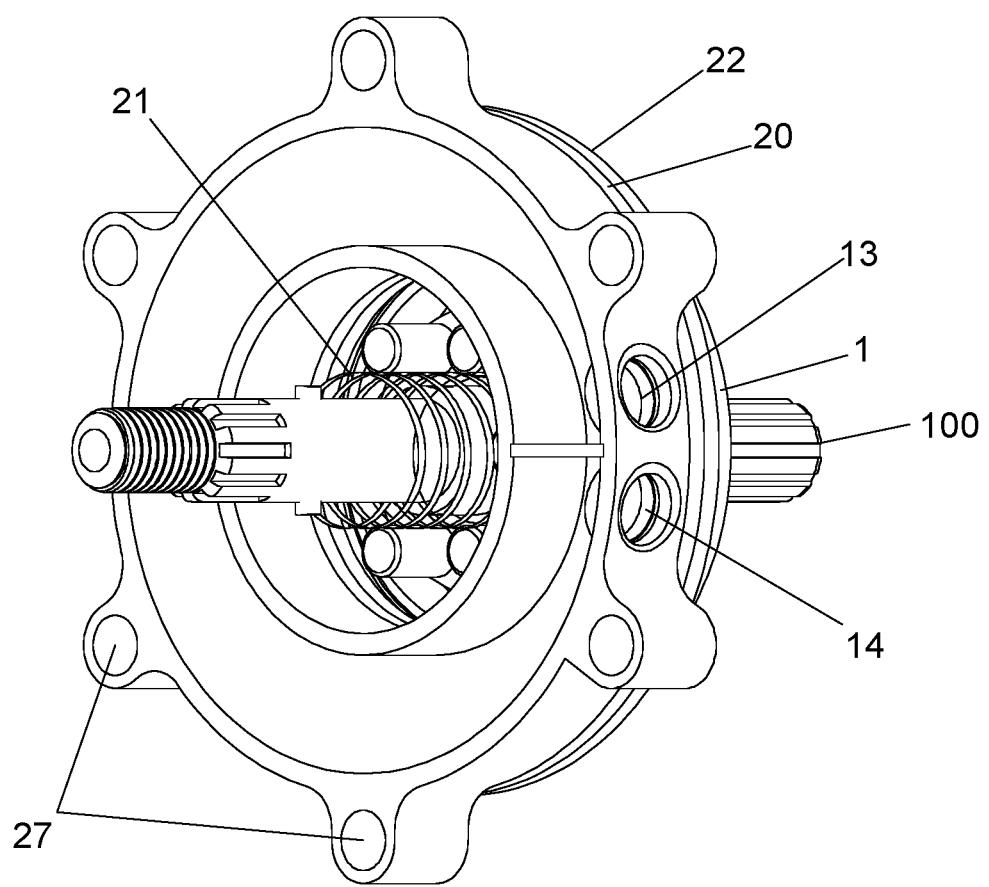
FIG. 7 shows a perspective view of the second embodiment of the device object of the invention having removed the bearing, the first supporting disc, the first brake lining and the first cast iron disc.
Figure 8:
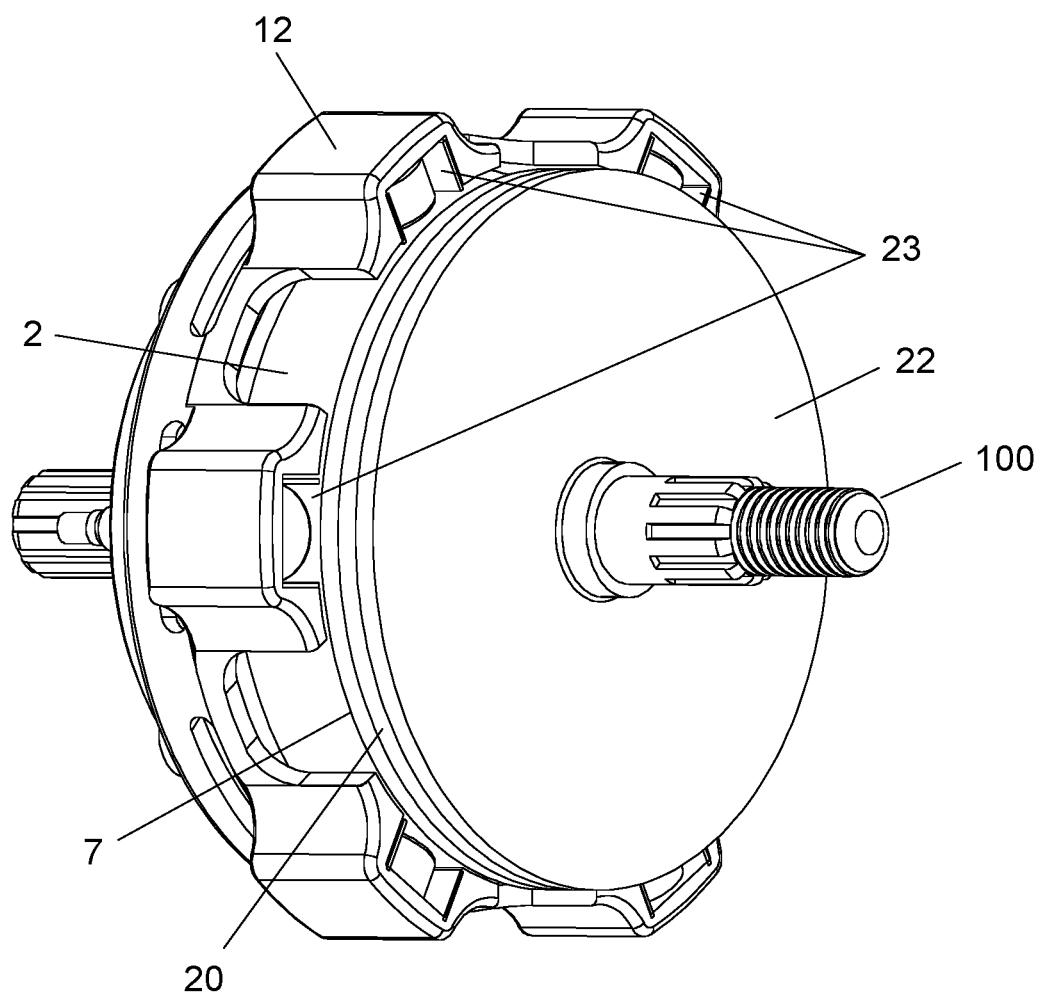
FIG. 8 shows a perspective view of the second embodiment of the brake device object of the invention, with the displacement of the container by means of perimeter channels in the casing and perimeter ball bearings in the container.
Figure 9:
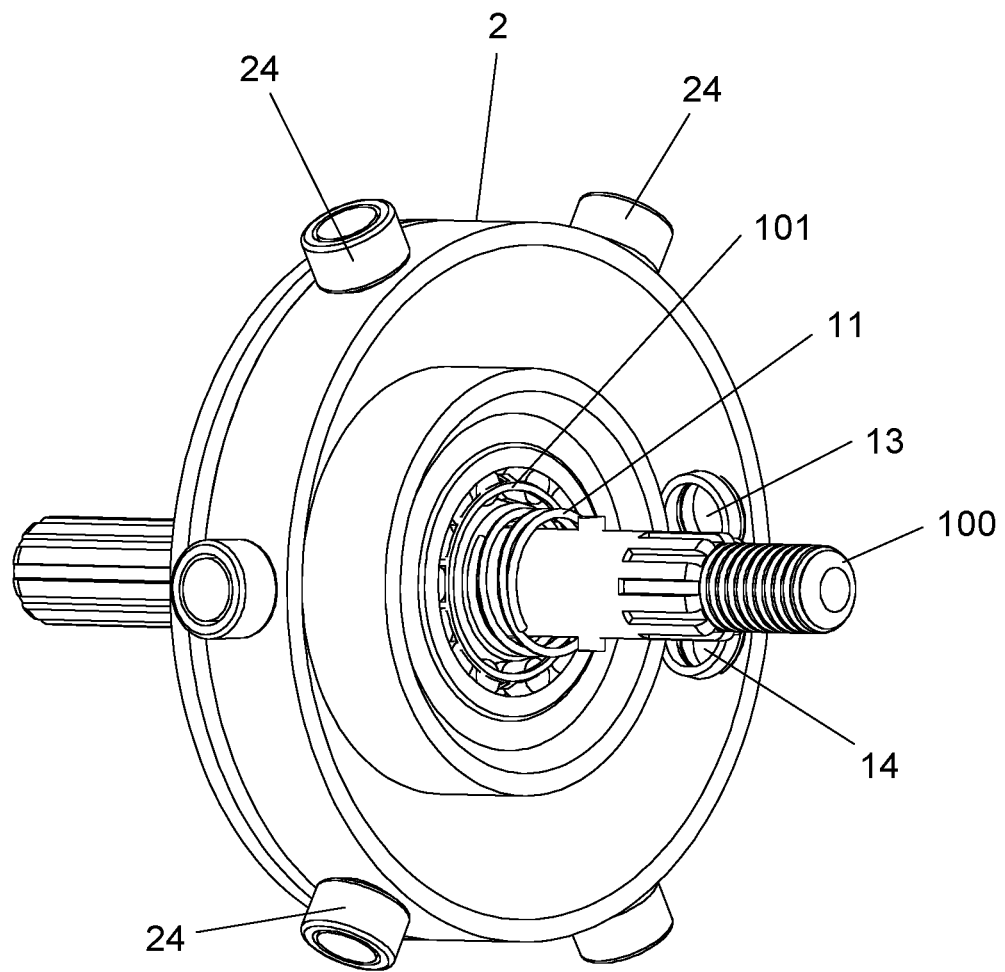
FIG. 9 shows a perspective view of the embodiment of FIG. 8 having removed the first brake lining, the first supporting disc, the first cast iron disc and the casing.
Figure 10:
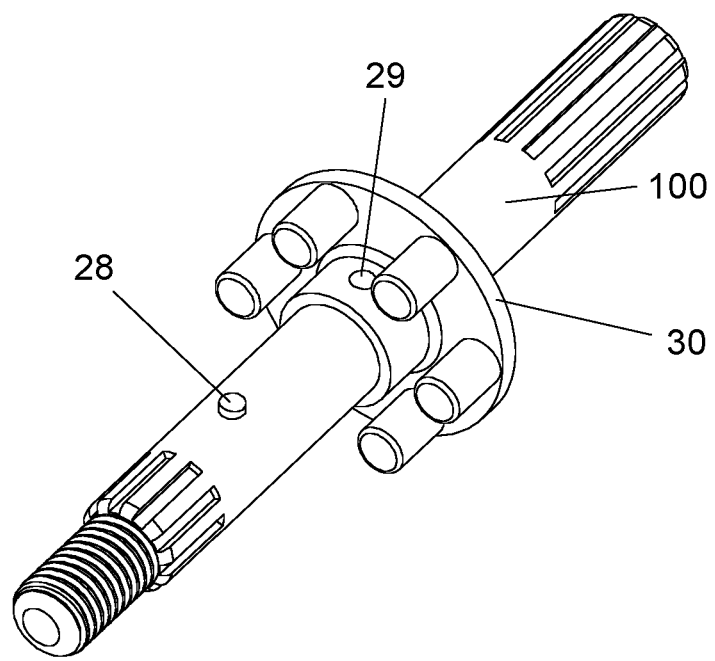
FIG. 10 shows in detail the fastening of the brake lining to the axle.

A list of the numerical references used in the depicted figures is provided below:
1.—piston,
2.—container,
3.—outer cylindrical wall,
4.—central cylindrical wall,
5.—first cast iron disc,
6.—brake line,
7.—second cast iron disc,
8.—inner circuit,
9.—first brake lining,
10.—supporting disc,
11.—spring,
12.—casing,
13.—first hole,
14.—second hole,
15.—inner wall,
16.—tubes,
17.—sealing gaskets,
18.—sensor,
19.—recess for passage of the tubes,
20.—second brake lining,
21.—second spring,
22.—second supporting disc,
23.—perimeter channels,
24.—perimeter ball bearings,
25.—perimeter threaded holes,
26.—guide screws,
27.—perimeter lugs,
28.—pin,
29.—accommodation,
30.—fastening part,
100.—axle, and
101.—bearing.

DETAILED DESCRIPTION

Next, two embodiments of the brake device object of the invention are described, making reference to the references used in the figures.

The brake device object of the invention is installed on an axle (100) of wheels and has two embodiments that will be described below.

The first embodiment of the brake device object of the invention, starting from the area furthest from the wheel, comprises:
a piston (1),
a container (2),
a first cast iron disc (5) joined to the container (2),
a second cast iron disc (7) joined to the container (2),
a first brake lining (9), and
a first supporting disc (10) on which the first brake lining (9) is located.

In the brake device object of the invention, the piston (1) and the container (2) together with the first cast iron disc (5) and the second cast iron disc (7) are placed on the axle (100) but they do not rotate together with the rotation of the axle (100), while the first supporting disc (10) and the first brake lining (9) are fixed to the axle (100) and rotate with the rotation of said axle (100).

The container (2), in the particular embodiment of said container (2) described herein, has the shape of a toroid with a rectangular section, and comprises a central cylindrical wall (4) located around the axle (100) and an outer cylindrical wall (3), such that both the first cast iron disc (5) and the second cast iron disc (7) are joined to the container (2) and, together with the central cylindrical wall (4) and the outer cylindrical wall (3), configure an inner circuit (8) to accommodate a coolant. To ensure that the inner circuit (8) is sealed, sealing gaskets (17) are located between the first cast iron disc (5) and the central cylindrical wall (4) and the outer cylindrical wall (3) of the container (2), as well as between the second cast iron disc (7) and the central cylindrical wall (4) and the outer cylindrical wall (3) of the container (2).

The container (2) comprises a first hole (13) and a second hole (14) located in the outer cylindrical wall (3) and further comprises an inner wall (15) in the inner circuit (8), the two holes (13, 14) being used so that the coolant can access and exit the inner circuit (8) of the container (2), as explained later in this specification.

During braking, the friction between the first cast iron disc (5) and the first brake lining (9) generates heat which, thanks to the device object of the invention, dissipates, as will be seen below, reducing the wear of the components and increasing braking efficiency.

Thus, the brake device object of the invention dissipates the heat generated by the friction of the first brake lining (9) against the first cast iron disc (5) by means of circulating the coolant through the inner circuit (8) of the container (2), which is introduced through the first hole (13) in the inner circuit (8); said coolant circulates through the inner circuit (8) absorbing the heat generated in the first cast iron disc (5) and leaves the inner circuit (8) through the second hole (14), the path of the coolant through the inner circuit (8) being forced by the inner wall (15).

The coolant, once it has exited the inner circuit (8), is carried by means of tubes (16) to a radiator or a heat exchanger (not shown in the figures) wherein the coolant loses temperature to be introduced back into the inner circuit (8) through the first hole (13), in this way a cooling circuit of the coolant is generated. In order to control the temperature of the coolant, the device object of the invention has two sensors (18) installed in the container (2).

Finally, the brake device object of the invention comprises a casing (12) covering at least the piston (1), such that the other components of the brake device object of the invention can be covered by the casing (12) or can be outside it.

Likewise, the casing (12) may comprise at least one recess (19) for the passage of the tubes (16) of the device object of the invention, when the design of the device requires that the tubes (16) go through the casing (12).

In the first embodiment, the device comprises a bearing (101) between the central cylindrical wall (4) of the container (2) and the axle (100), such that the container (2) rests on the bearing (101) that makes the container (2) independent of the rotating movement of the axle (100), therefore neither the container (2) with the two cast iron discs (5, 7) nor the piston (1) rotate together with the axle (100). Furthermore, the bearing (101) supports a first spring (11), such that the first spring (11) rests at one end on the bearing (101) and at the opposite end it rests on the first supporting disc (10) on which the first brake lining (9) is located, such that, when it does not receive pressure from the piston (1), the first cast iron disc (5) distances itself from the first brake lining (9), avoiding unnecessary friction.

The fastening of the first supporting disc (10) together with the first brake lining (9) to the axle (100) is carried out in an embodiment of the invention by means of a bolt or pin (28) that crosses the supporting disc (10) and the axle (100).

The fastening of the second supporting disc (22) together with the first brake lining (20) to the axle (100) is carried out in an embodiment of the invention by means of a disc-shaped part (30), which has guide axles, fixed to the axle (100) by means of a bolt or pin (29), which introduced in the corresponding accommodations thereof of the second supporting disc (22) forces it to rotate together with the axle (100), but enables it to displace linearly, by the action of the piston.

In this first embodiment of the device object of the invention, braking occurs because the piston (1) receives, when the vehicle brake pedal is pressed, a hydraulic fluid therein, through a break line (6), and therefore the piston (1) displaces the container (2) along with it with the first cast iron disc (5) towards the first brake lining (9), braking taking place due to friction between the first brake lining (9) and the first cast iron disc (5). The first spring (11) placed around the axle (100) rests at one end on the bearing (101) fixed in the central cylindrical wall (4) of the container (2) and at the opposite end it rests on the first supporting disc (10), forcing the assembly of the piston (1), the container (2) and the first cast iron disc (5) to return to its initial position once the hydraulic fluid stops entering the piston (1), in other words, it separates the mentioned assembly from the first brake lining (9).

There is a second embodiment of the brake device object of the invention, which further comprises a second brake lining (20) resting on a second supporting disc (22), the second brake lining (20) and the second supporting disc (22) being located between the piston (1) and the container (2).

In this second embodiment of the brake device object of the invention, a bearing (101) is also located between the central cylindrical wall (4) of the container (2) and the axle (100) so that the container (2) is in a stable position without rotation with respect to the axle (100).

Furthermore, this second embodiment comprises a second spring (21) located opposite the first spring (11) with respect to the bearing (101). The second spring (21) rests at one end on the bearing (101) and at the other end on the second supporting disc (22). With this arrangement, the container (2) remains fixed without rotation, while the springs (11, 21), the supporting discs (10, 22), the brake linings (9, 20) and the axle (100) rotate together.

The braking in the second embodiment of the brake device object of the invention occurs in two complementary steps: in a first step the piston (1), as a consequence of stepping on the brake pedal of the vehicle, receives a hydraulic fluid therein, displacing said piston (1) against the second supporting disc (22) by dragging the second brake lining (20) against the container (2), the second brake lining (20) coming into contact with the second cast iron disc (7) of the container (2), generating a first friction or braking friction; if in this situation the speed of the axle (100) on which the second brake lining (20) is fixed is reduced as desired, the action of the second spring (21), along with the fact that the hydraulic fluid ceases to enter the piston (1), separates the second brake lining (20) from the second cast iron disc (7) of the container (2). It may happen that the speed of the axle (100) must be further reduced, keeping the brake pedal pressed or increasing the pressure thereon to do so; the hydraulic fluid continues entering the piston (1) and the very piston (1) displaces the second brake lining (20), the second supporting disc (22) together with the container (2), the first cast iron disc (5) and the bearing (101) fixed to the container (2), compressing both the first spring (11) and the second spring (21), until making contact with the first brake lining (9) that is rotating with the axle (100).

Once the speed of the axle (100) has been reduced as desired, lifting of the vehicle brake pedal occurs, whereby the hydraulic fluid ceases to enter the piston (1) and the first spring (11) and the second spring (21) separate in a first step the first brake lining (9) from the first cast iron disc (5), and in a second step they separate the second brake lining (20) from the second cast iron disc (7), as explained above.

The fastening of the second brake lining (20) and the second supporting disc (22) is like the one already expressed for the first brake lining (9) and the first supporting disc (10), by means of complementary pins (28) and accommodations (29) or by means of a fastening piece (30) to which the second brake lining (20) and/or the second supporting disc (22) are subsequently fixed.

The container (2) moves along the axle (100) driven by the piston (1), said movement being guided along the axle (100). Guidance of the displacement along the axle (100) is achieved in one of the two ways set out below:

- a first way is by means of perimeter channels (23) located in the casing (12) and perimeter ball bearings (24) of the container (2) that face the perimeter channels (23) of the casing (12), such that the perimeter ball bearings (24) slide along the perimeter channels (23) of the casing (12).
- a second way is by means of perimeter threaded holes (25) of the casing (12) wherein guide screws (26) are introduced, such that the container (2) slides through said guide screws (26), thanks to perimeter lugs (27) of said container (2) that face the guide screws (26) of the casing (12).

The invention should not be limited to the particular embodiments described herein. Persons skilled in the art can develop other embodiments in view of the description made herein. Accordingly, the scope of the invention is defined by the following claims.

The invention claimed is:

1. A brake device for installation on an axle of wheels comprising:
   a piston,
   a casing accommodating at least the piston,
   a container,
   a first cast iron disc and a second cast iron disc, joined to the container,
   a first brake lining,
   a first supporting disc on which the first brake lining is located, and
   a bearing fixed to a central cylindrical wall of the container around the axle,
   wherein the container and the casing remain fixed without rotating about the axle and the first brake lining together with the first supporting disc are fixed to the axle, wherein the piston is further configured to displace the container together with the two cast iron discs towards the first brake lining until the first cast iron disc makes contact with the first brake lining, and wherein the container comprises an inner circuit configured to accommodate a coolant.

2. The brake device according to claim 1, wherein the inner circuit of the container is limited by the central cylindrical wall located around the axle, an outer cylindrical wall and the two cast iron discs that join the central cylindrical wall and the outer cylindrical wall.

3. The brake device according to claim 1, further comprising a first spring around the axle of the wheels, such that the first spring rests at one end on the bearing and at another end on the first supporting disc, wherein the first spring is configured to exert pressure on the first supporting disc when the first cast iron disc makes contact with the first brake lining, and to move the piston, the container and the first cast iron disc away from the first brake lining.

4. The brake device according to claim 1, further comprising:
   a second brake lining on a second supporting disc, the second brake lining located between the piston and the container,
   wherein the piston is configured to displace the second brake lining towards the second cast iron disc of the container, in a displacement prior to the displacement of the container and the first cast iron disc thereof towards the first brake lining.

5. The brake device according to claim 4, further comprising a second spring around the axle of the wheels, which rests at one end on the second supporting disc and at another end on the bearing, such that the second spring is configured to exert pressure on the second supporting disc when the second cast iron disc makes contact with the second brake lining, and to move the piston, the container and the second cast iron disc away from the second brake lining.

6. The brake device according to claim 1, comprising:
   a first hole to access the inner circuit,
   a second hole to access the inner circuit,
   wherein the coolant travels along the inner circuit by accessing it through the first hole and exiting through the second hole.

7. The brake device according to claim 6, the container further comprising:
   an inner wall located in the inner circuit, wherein the inner wall forces the coolant to travel along the inner circuit.

8. The brake device according to claim 6, further comprising:
   tubes that join the first hole and the second hole with a heat exchanger for the coolant.

9. The brake device according to claim 1, further comprising:
   at least one sensor in the container to control the temperature of the coolant.

10. The brake device according to claim 1, wherein:
    the casing comprises a plurality of perimeter channels,
    the container comprises a plurality of perimeter ball bearings, and
    wherein the perimeter ball bearings face the perimeter channels of the casing and the perimeter ball bearings are configured to slide along the perimeter channels of the casing.

11. The brake device according to claim 1, wherein:
    the casing comprises a plurality of perimeter threaded holes accommodating guide screws,
    the container comprises a plurality of perimeter lugs, and
    wherein the perimeter lugs accommodate the guide screws to guide sliding of the container along the guide screws.

* * * * *